United States Patent Office 3,548,665
Patented Dec. 22, 1970

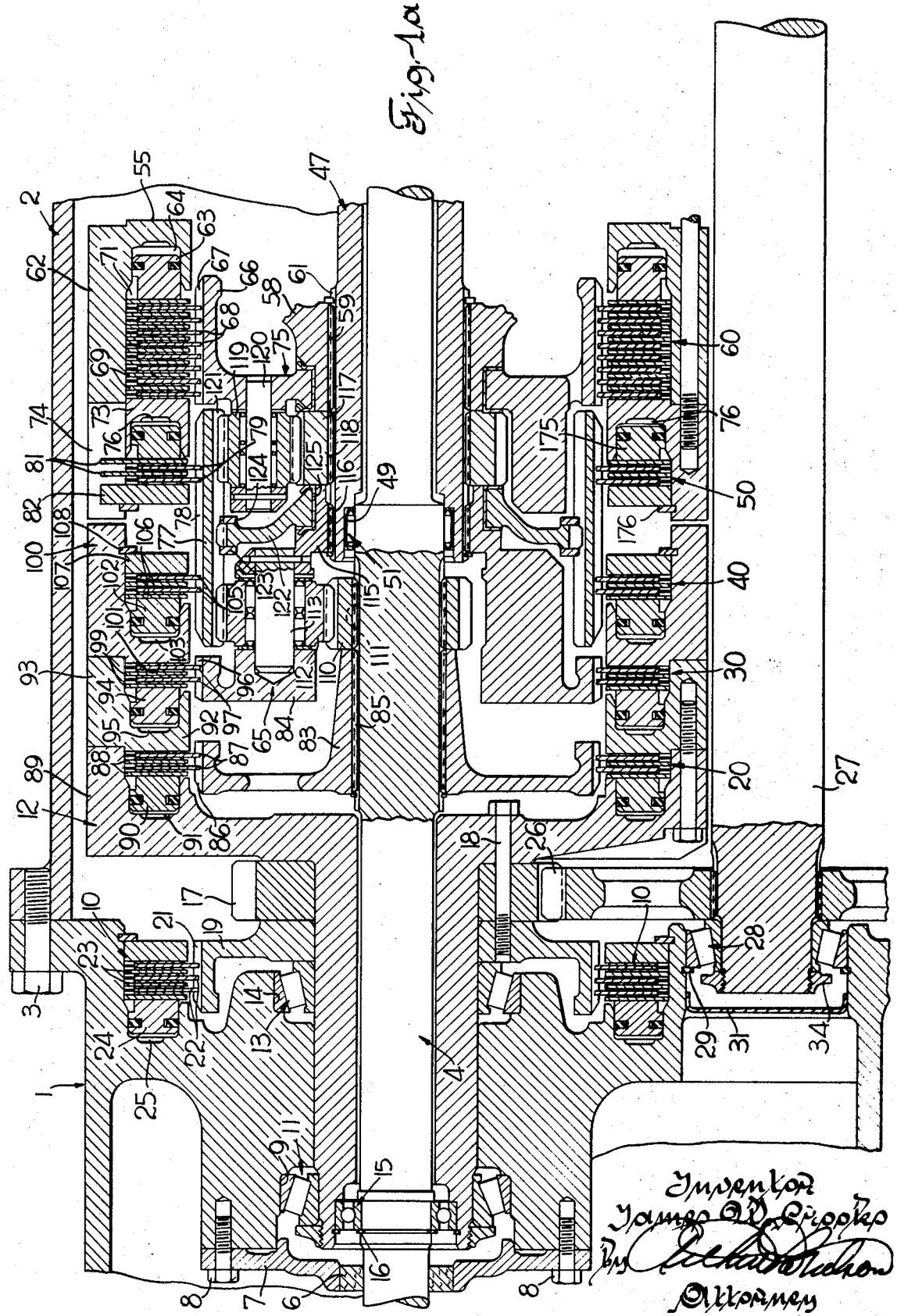

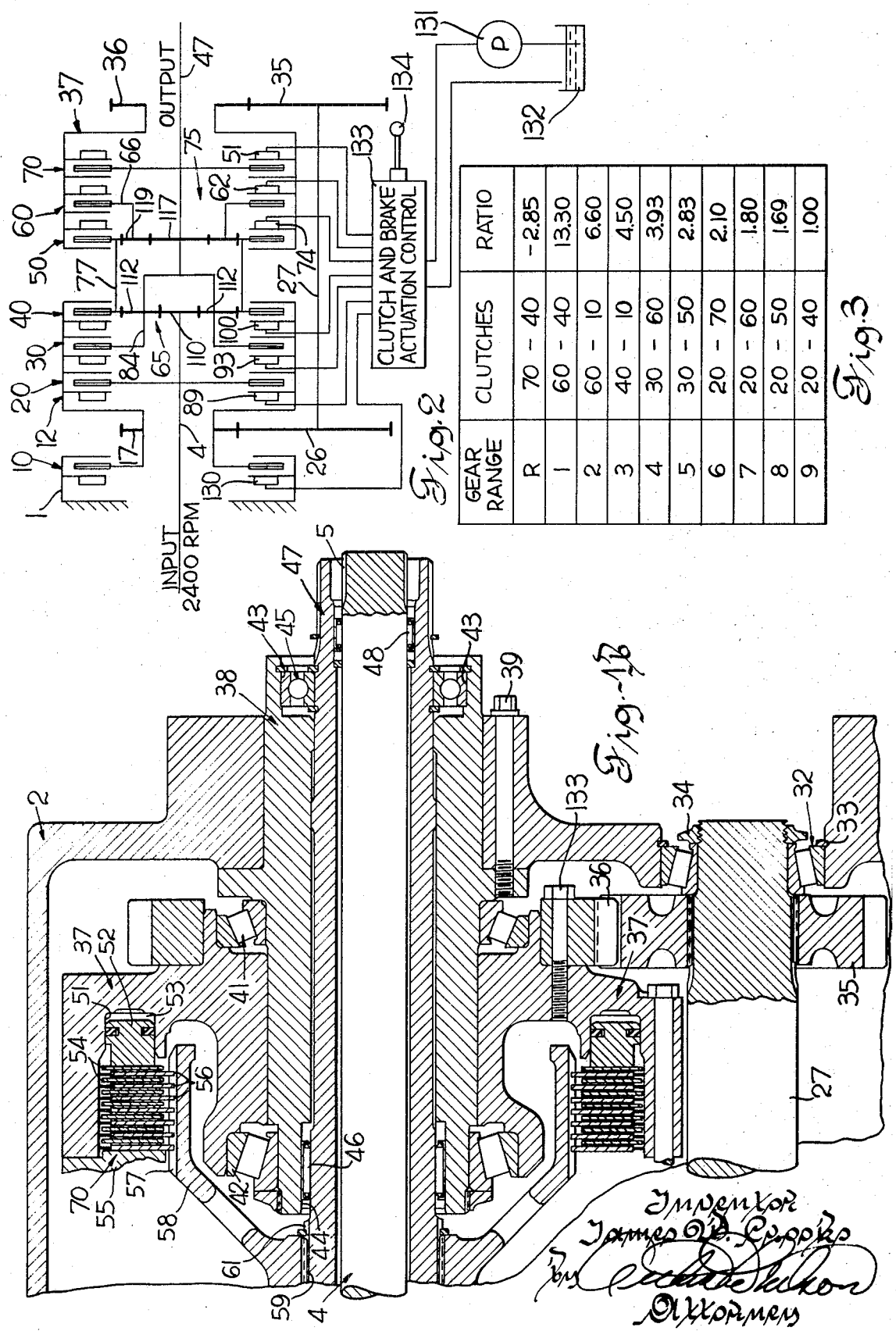

3,548,665
POWER SHIFT TRANSMISSION
James W. Crooks, Whitefish Bay, Wis., assignor to Allis-Chalmers Manufacturing Company, Milwaukee, Wis.
Filed June 11, 1969, Ser. No. 832,357
Int. Cl. B60k 17/28; F16h 37/06
U.S. Cl. 74—15.63
17 Claims

ABSTRACT OF THE DISCLOSURE

A vehicle transmission having two planetary gearsets and countershaft gearing including drive and driven gears carried on rotatable input and output clutch housings. Clutches on the clutch housings selectively engage clutch discs on the elements of the planetary gearsets to provide a plurality of output speed ratios through one gearset, both gearsets, and/or the countershaft gearing of said transmission.

---

This invention relates to a vehicle transmission and more particularly to a power shift transmission having two planetary gearsets, and countershaft gearing driving gears on input and output clutch housings. Clutches carried on said housings are selectively engaged and disengaged with elements of the planetary gearsets to provide a plurality of speed ratios through said transmission.

Draft vehicles use an internal combustion engine primarily as the source of power. The internal combustion engine operates with greatest efficiency within a predetermined speed range and the engine will also deliver the required torque characteristics within a predetermined speed range. The vehicle transmission is designed to provide smooth transmission of power to carry the draft load. The magnitude of the draft load and the speed at which the load must be drawn vary widely and in the case of a tractor, the transmission should have a plurality of speed ratios to accommodate the varying speeds and torque requirements for greatest efficiency on the internal combustion engine and versatility of operation.

The torque converter is used on many vehicles and will provide an infinite number of speed ratios for transmitting power. A torque converter, however, is expensive and there is a certain amount of power loss due to fluid friction in the torque converter. Its use also may cause a wide variation in vehicle speed when loads are imposed which is detrimental to accomplishing satisfactory power takeoff work. There are, therefore, inherent advantages in use of a direct gear drive power transmission providing an adequate number of speed ratios are built into the transmission and the convenience of shifting from one speed ratio to another is efficient and trouble-free.

Accordingly, this transmission provides nine speeds forward and one reverse through the use of two planetary gearsets and countershaft gearing. The operator selectively engages and disengages clutches in the clutch housings driven by the countershaft to provide power transmission of nine speed ratios forward and one reverse. The power shift transmission includes means for selective operation of clutches in the clutch housings for engagement with the elements of the planetary gearsets such as the sun gears, the planetary carriers, or the ring gear producing power paths through the planetary gearsets and countershaft gearing.

The power shift transmission will provide a maximum number of shift transitions employing a minimum number of clutches. The clutches have low relative clutch plate speeds in the forward ranges to provide minimum drag losses and accomplish smooth shift transition from one speed ratio to another. The drive shaft, driven shaft, and countershaft, together with the gearing, are supported by the end walls of the transmission case which provide adequate support. The same ring gear is used for both of the two planetary gearsets to simplify drive from the first to the second planetary gearset.

It is an object of this invention to provide a nine speed power shift transmission having two planetary gearsets and countershaft gearing.

It is another object of this invention to provide a power shift transmission having two planetary gearsets and countershaft gearing with a plurality of clutches mounted on input and output clutch housings including friction elements on the ring gear, sun gear, or planetary carriers of said planetary gearsets to provide a plurality of power paths and speed ratios for the transmission.

It is a further object of this invention to provide a power shift transmission including two planetary gearsets having clutch housings carrying gears with rotatable countershaft gearing connected intermediate the gears on said clutch housings and clutches on said clutch housings to selectively engage friction elements of said clutches carried on the ring gear, planetary carrier, and/or the sun gear to provide a plurality of power paths and gear ratios through said transmission.

It is a further object of this invention to provide power shift transmission including two planetary gearsets having ring gears integral with each other and said planetary gearsets in series. The transmission also includes input and output clutch housings rotating concentrically with the first and second planetary gearsets with clutches mounted on said housing to selectively and alternatively engage friction members of the clutches connected to the sun gear, the ring gear, and/or the planetary carriers to provide plurality of speed ratios and power paths through said transmission.

The objects of this invention are accomplished by the use of power shift transmission using two planetary gearsets mounted for rotation on concentric centers and in series arrangement. An input shaft is connected to the sun gear of the first planetary gearset while the output shaft is connected to the sun gear of the second planetary gearset and the planetary carrier of the first planetary gearset.

The input drive shaft is adapted for clutching to the input clutch housing which rotates about a common axial center with the input drive shaft, and the output clutch housing is adapted for clutching to an output drive shaft and rotates about a common axial center with the output drive shaft. A countershaft is mounted in parallel with the input and output drive shafts and has a gear driven by a gear on the input clutch housing and driving a gear on the output clutch housing. A plurality of clutches are mounted on each of said housings adapted for selectively and alternatively engaging a friction element of the clutches on the sun gear, planetary carriers, and/or ring gear of their mating planetary gearsets to provide a plurality of power paths through said transmissions. The transmission operates through a single planetary gearset, or through two planetary gearsets in series, or as a combination of planetary gearsets and countershaft gearing to provide a plurality of speed ratios and torque output to accommodate varying speed and torque load demands of the vehicle.

The preferred embodiments of this invention will be illustrated in the attached drawings.

FIG. 1a shows the input end of the transmission.
FIG. 1b shows the output end of the transmission.
FIG. 2 is a schematic illustration of the transmission.
FIG. 3 is a table showing gear ratios of the transmission and indicating the clutches engaged to obtain each gear ratio forward and reverse.

The transmission as shown in FIGS. 1a and 1b is adapted for use in a draft vehicle such as a tractor. The transmission is positioned between the internal combustion engine and the differential on the tractor with the shaft 4 driven by the engine. The shaft housing 1 is fastened to the transmission case 2 by means of a plurality of bolts 3. The housing 1 rotatably supports the drive shaft 4 which extends through the transmission case 2 and is splined at 5 to operate as a live constant speed power takeoff if so desired.

The input drive shaft 4 is rotatably mounted in the seal assembly 6 which is embraced by the end plate 7 fastened to the housing 1 by means of a plurality of bolts 8. The housing 1 is also formed with annular recess 9 which receives the bearing assembly 11 for rotatably supporting an input clutch housing 12. The input clutch housing 12 is also supported by bearing assembly 13 received within the annular recess 14 in the housing 1. The input drive shaft 4 is rotatably mounted in the bearing assembly 15 which is held by the snap rings 16 in the outer periphery of the input drive shaft 4 and clutch housing 12 to provide a rotatable relationship between the input clutch housing 12 and the input shaft 4.

The input drive gear 17 embraces the input clutch housing 12 and is fastened by means of a plurality of bolts 18 which also fastens the brake hub 19 to the input clutch housing 12. The brake hub 19 is formed with a spline 21 on its outer periphery adapted for receiving a plurality of rotatable brake discs 22. Interposed between the plurality of brake discs 22 are a plurality of stationary brake discs 23 fastened to the housing 1. The brake discs 22 and 23 are annular discs concentric the axis of the input drive shaft 4 and adapted for axial movement to frictionally engage each other or run freely in side-by-side relation when the brake is not engaged. The brake 10 is operated by an annular piston 24 defining an actuating chamber 25 in the housing 1. When the brake 10 is actuated, the brake hub 19 is braked to a stationary condition relative to the housing 1 which defines the annular cylinder for receiving the annular piston 24.

The input drive gear 17 drives the gear 26 which is fastened to the countershaft 27 by means of a spline connection. The countershaft 27 is rotatably mounted in the bearing assembly 28 mounted in the housing 1. The bearing assembly 28 is held in position by the snap ring 29 and on the housing 1 as well as the seal plug 31 mounted stationary at the front end of the countershaft 27.

The bearing assembly 32 is mounted within the transmission case 2 and retained by the snap ring 33 on housing 2. Retainer locknuts 34 on the ends of the countershaft 27 clamp the gears 26 and 35 and inner races of bearings 28 and 32 so as to prevent a loose relationship to the countershaft 27. The countershaft 27 is splined to receive a mating splined pinion gear 35. The pinion gear 35 drives the driven gear 36 which is fastened to the output clutch housing 37 by means of a plurality of bolts 133. A sleeve 38 is fastened to the gear case 2 by means of a plurality of bolts 39. The external periphery of the sleeve 38 is embraced by bearing assemblies 41 and 42. The output clutch housing 37 embraces the bearing assemblies 41 and 42 and is rotatably mounted for rotation upon a common axial center with the input drive shaft 4 which extends through the gear case 2.

The inner periphery of the sleeve 38 is formed with annular recesses 43 and 44 to receive the bearing assembly 45 and the needle bearing assembly 46. The ball bearing assembly 45 and the needle bearing assembly 46 embrace the quill output shaft 47. The input drive shaft 4 extends coaxially through the quill shaft 47 and the needle bearing 48 is positioned intermediate the outer end of the input drive shaft 4 and the quill shaft 47. The inner end of the quill shaft 47 defines a recess 49 which receives the needle bearing assembly 51 to maintain concentric rotation of the input drive shaft 4 the quill shaft 47. The quill shaft 47 is splined on its end to provide a suitable drive means to the output drive of the vehicle.

The output clutch housing 37 is constructed with a plurality of hydraulic actuators including annular cylinders and pistons and pressure plates for engaging the stack of clutch discs. Referring to FIG. 1b, an output clutch housing 37 defines an annular cylinder 51 which receives a piston 52. The cylinder 51 and the piston 52 define a pressurizing chamber 53. The piston 52 compresses the disc stack 54 against a reaction portion 55 at cylinder 62 when the clutch is actuated. A plurality of clutch discs 56 are splined on the inner periphery and received on the mating spline external periphery 57 of the clutch hub 58. The clutch hub 58 also defines a spline connection 59 on its inner periphery for engaging the spline 61 on the external periphery of the quill shaft 47. Accordingly, the drive connection through the counter shaft 27 is connected to the output shaft 47 when the clutch 70 is engaged. The output clutch housing 37 carries the clutch 60 which is defined by the annular cylinder 62 which receives the annular piston 63 defining a pressurizing chamber 64. The planetary carrier 66 of the planetary gearset 75 forms a splined external periphery 67 which is embraced by a plurality of clutch discs 68 which have mating splined internal peripheries. Intermediate the clutch disc 68 is a plurality of discs 69 which are received on the spline 71 of the cylinder 62. The reaction portion 73 is positioned on the opposite side of the discs from the cylinder 62.

The output clutch housing 37 also includes an annular cylinder 74 which receives the annular piston 175 which in turn defines a pressurizing chamber 76. The ring gear 77 for the planetary gearsets 65 and 75 is integral and forms a splined external periphery 78 which receives a plurality of clutch discs 79. Interposed between the clutch discs 79 is the plurality of clutch discs 81. The reaction plate 82 is received within the inner periphery of the cylinder 74 and locked in place by snap ring 176. Reaction plate 82 provides a means for supporting compressing the discs stack of the clutch 50 when the clutch is engaged.

A planetary gearset 65 also is connected to a plurality of clutches on the input clutch housing 12. A clutch hub 83 is connected by means of a splined connection 85 to the input drive shaft 4. The clutch hub 83 has a splined external periphery 86 which receives a plurality of discs 87. Interposed between the discs 87 are a plurality of discs 88 connected to the input clutch housing 12. The input clutch housing 12 defines annular hydraulic cylinder 89 which receives an annular piston 90 defining the pressurizing chamber 91. When the clutch is actuated the piston moves to compress the disc stack of the clutch 20 against the reaction plate 92 formed by the annular hydraulic cylinder 93.

The annular hydraulic cylinder 93 receives the annular piston 94 which defines a pressurizing chamber 95. The planetary carrier 84 of the planetary gearset 65 forms a spline 96 to receive mating spline discs 97. The mating spline discs 97 engage the discs 99 which are connected to a cylinder 93 of the input clutch housing 12. The hydraulic cylinder 100 forms a reaction plate 101 for clutch 30.

The hydraulic cylinder 100 receives an annular piston 102 which forms a pressurizing chamber 103. The ring gear 77 is embraced by a plurality of discs 105. The plurality of discs 106 are positioned intermediate the discs 105. The reaction plate 107 is received within the inner periphery of the cylinder 100 and locked in position by a snap ring 108.

The planetary gearset 65 includes a sun gear 110 which is splined on its inner periphery and received on the mating splined portion of the spline 111 on the external periphery of the input drive shaft 4. The sun gear 110 meshes with a plurality of planetary gears 112 each mounted on a pin 113 in the carrier 84. The planetary gears 112 mesh with the ring gear 77 which is integral with the ring gear for the planetary gearset 75. The planetary carrier 84 includes a carrier supporting annulus 115 which is splined at 116 and embraces a mating spline portion of the quill output shaft 47. The carrier supporting annulus 115 provides a drive from the carrier of the planetary gearset 65 to the quill shaft 47 which is the transmission output drive shaft.

The planetary gearset 75 also includes a sun gear 117 splined at 118 and embracing a splined mating portion on the quill output shaft 47. The sun gear 117 meshes with a plurality of planetary gears 119 each mounted on a pin 120. The pins 120 are supported in the carrier 66 which carries the clutch discs 68.

A plurality of planetary gears 119 mesh with the ring gear 77 which has gear teeth 121 on its inner periphery. The ring gear 77 is supported by an annular support 122 locked in the intermediate position by snap rings 123 and 124. Annular support 122 is supported on the bushing 125 carried on the support annulus 115. The annular support 122 is free to rotate relative to the quill output shaft 47 and the input shaft 4.

Referring to FIG. 2 the power shift transmission is shown schematically. The brake 10 is connected to the housing 1 for braking the input housing 12. The input housing 12 carries the gear 17 which meshes with gear 26 on the countershaft 27. The countershaft 27 also carries the pinion gear 35 which meshes with the driven gear 36 on the output clutch housing 37. The input drive shaft 4 is connected to the sun gear 110. The planetary carrier 84 is connected to the quill shaft 47 providing the output drive from the transmission. The ring gear 77 engages the planetary gears 112 of gearset 65 and the planetary gears 119 of gearset 75. The sun gear 117 of the planetary gearset 75 is also connected to the quill shaft 47. The schematic illustration of FIG. 2 illustrates the operation of the transmission in a more simplified form and FIG. 3 illustrates the gear range and transmission speed ratios when the brake and clutches as indicated are actuated. The functional operation will be more completely described in the subsequent paragraphs.

The transmission as shown includes hydraulic actuators for actuating the brake and clutches as shown in FIG. 2. A source of pressurized fluid is provided by the pump 131 receiving the hydraulic fluid from the reservoir 132. The pump 131 supplies pressurized fluid to the clutch and brake actuation control 133. Fluid released from the actuators of the brake and clutches is returned to the reservoir 132 through the clutch and brake actuation control 133. The lever 134 on the clutch and brake actuation control 133 is adapted to actuate the brake 10 and the clutches 20, 30, 40, 50, 60 and 70. Hydraulic conduits singularly connect the actuation control 133 with the actuator 130 of the brake 10 and the actuators 89, 93, 100, 74, 62 and 51 for the clutches. The actuation control is adapted to actuate any of these actuators singularly or in any combination to provide the gear ranges as shown in FIG. 3 when the clutches indicated are actuated.

When the transmission is in reverse the clutch 70 and the clutch 40 are actuated, the input torque passes from the sun gear 110 to the carrier 84 and ring gear 77. The ring gear torque is then in a negative direction and is connected to the countershaft gear train by the clutch 40. The negative torque is multiplied by the countershaft gears and transferred to the carrier output by means of clutch 70. The difference between the positive torque given to the carrier by the sun gear and the negative torque given to the carrier by the ring gear multiplied by the countershaft gears is a net resultant negative torque to the output quill shaft 47.

The transmission when shifted into first gear range forward as indicated on the table in FIG. 3, will provide an input torque which passes to the sun gear 110. Positive torque is transferred to the carrier 84 and negative reaction torque is transferred to the portion of the ring gear 77 meshing with the front planetary gears 112. This negative torque passes through the portion of the ring gear 77 meshing with the rear planetary 119 and contributes to negative to the carrier 66. Torque on the carrier 66 is regenerated through the clutch 60 and the countershaft gearset and clutch 40 back to the ring gear 77. This results in a much higher negative torque on the portion of the ring gear meshing with the rear planetary gears 119 than the initial reaction from the front planetary gearset 65. The reaction to the total negative torque on the portion of the ring gear 77 meshing with the rear planetary gears 119 is positive on the sun gear 119, so this positive reaction is additive to the torque on the carrier 84 resulting in a high numerical torque ratio multiplication on the output quill shaft 47.

When the transmission is shifted into the second gear range the input torque passes to the sun gear 110. The carrier 66 is held by the clutch 60 through the countershaft gearset and brake 10 which is grounded. Torque on the sun gear 110 is transferred as a positive torque to the carrier 84 and negative torque to the ring gear 77. The negative torque on the ring gear is converted to a positive on the sun gear 117 which adds to the torque on carrier 84 to give a total positive torque on the output quill shaft 47.

With the transmission in the third gear range, the input torque passes to the sun gear 110. The ring gear is held by the clutch 40 which is, in turn, grounded by the brake 10. With the ring gear braked, a simple planetary reduction to the output quill shaft 47 is produced.

With the transmission operating in fourth gear range, the input torque passes to the sun gear 110. The positive torque is transferred to the carrier 84 and negative reaction torque is transferred to the ring gear 77. The ring gear 77 transfers positive torque to the sun gear 117 and negative torque to the carrier 66. The negative torque on the carrier 66 is passed by means of the clutch 60 to the countershaft gearset where it is reduced and passed to the clutch 30. The negative torque on the clutch 30 passes to the carrier 84. The difference between the negative torque on the carrier 84 from the clutch 30 and the positive torque from the sun gear 110 results in a net positive torque on the carrier 84 which adds to the positive torque on the sun gear 117 of the second planetary gearset to give a total positive torque on the output quill shaft 47.

With the transmission shifted into fifth gear range, the input torque passes to the sun gear 110 of the first planetary gearset 65. Positive torque is transferred to the carrier 84 and negative torque is transferred to the ring gear 77. The negative torque on the ring gear 77 is directly passed by means of a clutch 50 to the countershaft gearset where the torque is reduced and passed to the clutch 30. The negative torque on the clutch 30 passes to the carrier 84. The difference between the negative torque on the carrier 84 from the clutch 30 and the positive torque from the sun gear 110 of the first planetary gearset results in a net positive torque on the output quill shaft 47.

With the transmission shifted into the sixth gear range, the input torque passes to the countershaft gear train by the clutch 20. The input torque is multiplied by the countershaft gears and transferred to the output shaft by the clutch 70 which is connected to the sun gear 117 and the output quill shaft 47. The planetary gearsets have no function for this particular gear range and the power flows through the countershaft gear train. With the transmission shifted into seventh gear range, the input torque divides and passes partly to sun gear 110 of the planetary gearset 65 and partly to clutch 20. The portion of the input torque given to the clutch 20 is multiplied by the countershaft type gears and transferred to the carrier 66 by the clutch 60. A portion of the resultant torque on the carrier 66 becomes reaction for the torque on the carrier 84, and the other portion of the torque on the carrier 66 is added to the sun gear 117 of the second planetary gearset. The output torque is the sum of the resultant torque on the sun gear 117 of the second planetary gearset and the resultant torque of the carrier 84.

With the transmission shifted into the eighth gear, the input torque divides and passes partly to sun gear 110 of the first planetary gearset 65 and partly to clutch 20. The portion of the torque given to the clutch 20 is multiplied by the countershaft type gears and transferred to the ring gear by the clutch 50. The output torque is the sum of the resultant ring gear torque and the portion of the input torque going to the sun gear 110 of the first planetary gearset.

When the transmission shifts into the ninth gear, the input torque passes to the sun gear 110 of the first planetary gearset and the clutch 20. The clutch 20 drives the clutch 40 which is connected to the ring gear of the first planetary gearset 65. The planetary gearset 65 is thereby locked together by the clutches 40 and 20 giving a direct drive to the output quill shaft 47.

The transmission is also provided with an output shaft brake which functions in the following manner. For braking, the torque to be braked passes from the output quill shaft 47 to the clutch 70. This torque is then reduced by the countershaft gearset and transferred to the brake 10 which is grounded. This braking function stops only the output shaft and countershaft leaving the input shaft free to remain being turned by the engine and to continue driving a power takeoff load if so desired.

The preferred embodiments of this invention have been illustrated and described wherein the transmission operates to provide a reverse gear, a brake, and nine speeds forward for selective operation of the actuators actuating the brake and clutches.

The embodiments of the invention in which an exclusive property or privilege is claimed are defined as follows:

1. A transmission comprising an input shaft and an output shaft rotatably mounted in a transmission case, a first planetary gearset having a sun gear driven by said input shaft, a second planetary gearset having the sun gear connected to the planetary carrier of said first planetary gearset and driving said output shaft, means connecting the ring gear of said first planetary gearset with the ring gear of said second planetary gearset, an input clutch housing rotatably mounted for concentric rotation with said input shaft, an output clutch housing mounted for concentric rotation for said output shaft, a single friction member connected to an element of each of the elements of the first planetary gearset including the sun gear, ring gear, and planetary carrier, a plurality of clutches on said input clutch housing with each clutch including only one of said friction members connected to said first planetary gearset, a single friction member connected to an element of each of the elements of the second planetary gearset including a sun gear, a ring gear, and a planetary carrier, a plurality of clutches on said output clutch housing with each clutch including only one of said members connected to said second planetary gearset, a brake mounted on said transmission case, a friction member on said input clutch housing included in said brake, a drive gear connected to input clutch housing, a driven gear connected to the output clutch housing, countershaft gearing for engaging said drive gear and said driven gear thereby providing countershaft gearing between said clutch housings, means for selectively actuating one or more of said brake or clutches to thereby selectively provide power paths and gear ratios through said transmission.

2. A transmission comprising an input shaft and an output shaft rotatably mounted in a transmission case, a first planetary gearset having a sun gear driven by said input shaft, a second planetary gearset having a sun gear connected to the planetary carrier of said first planetary gearset and driving said output shaft, means connecting the ring gear of the first planetary gearset and the ring gear of said second planetary gearset, an input clutch housing rotatably mounted for concentric rotation with said input shaft, an output clutch housing rotatably mounted for concentric rotation with said output shaft, a drive gear on said input clutch housing, a driven gear on said output clutch housing, countershaft gearing driven by said drive gear and driving said driven gear on said clutch housings, a single friction member connected to an element of each of the elements of said first planetary gearset including the ring gear, sun gear, and planetary carrier, a single friction member connected to an element of each of the elements including the ring gear, sun gear, and planetary carrier on said second planetary gearset, a plurality of clutches mounted on said input clutch housing with each clutch including only one of said friction members on said first planetary gearset, a plurality of clutches mounted on said output clutch housing with each clutch including only one of said friction members on said second planetary gearset, means for selectively actuating one or more of said clutches to thereby provide selective power paths and gear ratios of said transmission.

3. A transmission as set forth in claim 2 wherein said input clutch housing carries a clutch mounted on said input housing having a friction member connected to the ring gear of said first planetary gearset, and said output clutch housing carries a clutch having a friction member connected to the sun gear of said second planetary gearset to thereby provide two power paths through said transmission the first being through the said planetary gearsets and the second being through the countershaft gearing wherein said transmission provides a reverse speed which is the resultant of the difference between positive torque supplied to the sun gear of the second planetary gearset through the countershaft gearing and the negative torque from the ring gear to produce a resultant reverse output of the output shaft.

4. A transmission as set forth in claim 2 wherein said input clutch housing includes a clutch having a friction member connected to a ring gear of said first planetary set and a clutch on said output clutch housing having a friction member connected to the planetary carrier of said second planetary gearset producing reaction torque on the ring gear and carrier which is additive and positive to the sun gear of the second planetary gearset to thereby provide a forward speed having a high numerical torque ratio on the output shaft.

5. A transmission as set forth in claim 1 wherein said output clutch housing carries a clutch having a friction member connected to the carrier on said second planetary gearset, said brake brakes the input clutch housing producing a positive torque on the carrier of the first planetary gearset and a positive torque from the ring gear to the sun gear of the second planetary gearset providing a positive torque output on the output shaft.

6. A transmission as set forth in claim 1 wherein said input clutch housing carries a clutch having a friction member connected to the ring gear of said first planetary gearset and said brake includes a friction member for locking said input housing to the casing to provide a simple planetary reduction through said first planetary gearset to said output shaft.

7. A transmission as set forth in claim 2 wherein said input clutch housings includes a clutch having a friction member connected to the planetary carrier of said first planetary gearset, said output clutch housing includes a clutch having a friction member connected to a second planetary carrier of said second planetary gearset whereby actuation of said clutches produces a positive torque transferred to the carrier of said first planetary gearset and a positive torque on the sun gear of said second planetary gearset and thereby provide a positive torque on the output shaft.

8. A transmission as set forth in claim 2 wherein said input clutch housing carries a clutch having a friction member connected to the planetary carrier of said first planetary gearset, said second output clutch housing carries a clutch having a friction member connected to the ring gear from said second planetary gearset whereby actuation of said clutches results in a positive torque on the planetary carrier of the first planetary gearset and a net positive output of said transmission.

9. A transmission as set forth in claim 2 wherein said input clutch housing carries a clutch having a friction element connected to the sun gear on first planetary gearset, said output clutch housing carries a clutch including a friction member connected to the sun gear of said second planetary gearset, when said clutches are actuated, said planetary gearsets become inoperative and the countershaft gearing transmits power from the input to the output shaft of said transmission.

10. A transmission as set forth in claim 2 wherein said input clutch housing carries a clutch having a friction member connected to the sun gear of said first planetary gearset, said output clutch housing carries a clutch having friction member connected to a planetary carrier of said second planetary gearset and when said clutches are actuated to thereby transmit power through the countershaft gearing and torque from the planetary carrier of the first planetary gearset and the output torque is the sum of the resultant torque of the sun gear of the second planetary gearset and the torque of the carrier of said first planetary gearset.

11. A transmission as set forth in claim 2 wherein said input clutch housing carries a clutch having a friction member connected to the sun gear of the first planetary gearset, said output clutch housing carries a clutch having a friction member connected to the ring gear of said second planetary gearset, said transmission thereby provides an output torque which is the sum of the resultant torque of the ring gear torque from the first planetary gearset transferred to the output clutch housing and the portion of the input torque applied to the sun gear of the first planetary gearset.

12. A transmission as set forth in claim 2 wherein said input clutch housing carries a clutch having a friction member connected to the sun gear of the first planetary gearset, said input clutch housing carries a clutch having a friction member connected to the ring gear of said first planetary gearset, said transmission thereby provides a drive through said first planetary gearset which is locked to the output shaft to provide a forward output of said transmission.

13. A transmission as set forth in claim 1 wherein said output clutch housing carries a clutch having a friction member connected to the sun gear of the second planetary gearset and when said clutch and said brake are actuated a braking torque of said transmission is produced to lock said transmission output shaft.

14. A transmission as set forth in claim 1 wherein said input clutch housing carries three clutches and each clutch includes one of said friction members connected to said sun gear, ring gear, and planetary carrier of said first planetary gearset, said output clutch housing carries three clutches and each clutch includes one of said friction members connected to said sun gear, ring gear and planetary carrier of said second planetary gearset to thereby provide a transmission having nine speeds forward and one reverse.

15. A transmission as set forth in claim 2 wherein said input clutch housing carries three clutches and each clutch includes one of said friction members on said first planetary gearset including said sun gear, ring gear and planetary carrier, said output clutch housing carries three clutches and each clutch includes one of said friction members on said sun gear, ring gear and planetary carrier of said second planetary gearset to thereby provide a transmission having seven speeds forward and one reverse.

16. A transmission as set forth in claim 1 wherein said output clutch housing carries a clutch having a friction member connected to the sun gear of the second planetary gearset, said brake locks the input clutch housing to the transmission case, said input shaft is adapted for power takeoff output drive, said clutch and brake provide braking of the output shaft while permitting the input shaft to rotate.

17. A transmission as set forth in claim 1 wherein said output shaft is a quill shaft and said input shaft comprises a shaft extending coaxial through the output quill shaft and includes a means for power takeoff connection, said output clutch housing carries a friction member connected to the sun gear of the second planetary gearset and when said clutch and said brake are actuated said brake locks said housings through the countershaft gearing to thereby lock the output shaft while permitting continued rotation of the power input shaft for power takeoff.

References Cited
UNITED STATES PATENTS

| | | | |
|---|---|---|---|
| 2,511,039 | 6/1950 | Black et al. | 74—720 |
| 2,793,533 | 5/1957 | Swenson et al. | 74—15.63 |
| 2,932,202 | 4/1960 | Rinkena | 74—15.63X |
| 3,065,643 | 11/1962 | Mark et al. | 74—15.63 |
| 3,430,518 | 3/1969 | Auriol | 74—705 |
| 3,487,724 | 1/1970 | McFretyre et al. | 74—15.6X |
| 3,487,723 | 1/1970 | Piot | 74—682 |

ARTHUR T. McKEON, Primary Examiner

U.S. Cl. X.R.

74—674, 682, 705